US008128467B2

(12) United States Patent
Weichholdt et al.

(10) Patent No.: US 8,128,467 B2
(45) Date of Patent: Mar. 6, 2012

(54) CROP RESIDUE CHOPPING AND SPREADING ARRANGEMENT FOR A COMBINE HARVESTER

(75) Inventors: Dirk Weichholdt, Woelfling les Sarreguemin (FR); Oliver Klein, Saarlouis (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/840,667

(22) Filed: Jul. 21, 2010

(65) Prior Publication Data
US 2011/0045883 A1 Feb. 24, 2011

(30) Foreign Application Priority Data
Aug. 20, 2009 (DE) .......................... 10 2009 028 766

(51) Int. Cl.
*A01F 12/40* (2006.01)
(52) U.S. Cl. ........................ 460/112; 460/111
(58) Field of Classification Search .................. 460/111, 460/112; 406/98
See application file for complete search history.

(56) References Cited

U.S. PATENT DOCUMENTS

| | | | | | |
|---|---|---|---|---|---|
| 1,576,076 A | * | 3/1926 | Walker | ............. | 406/71 |
| 2,180,379 A | * | 11/1939 | Whitfield | ............. | 406/98 |
| 2,239,913 A | * | 4/1941 | Hall | ............. | 406/98 |
| 2,405,695 A | * | 8/1946 | Hitchcock et al. | ............. | 406/63 |
| 2,858,625 A | * | 11/1958 | Rivinius | ............. | 37/256 |
| 2,946,629 A | * | 7/1960 | Headley | ............. | 406/41 |
| 3,250,574 A | * | 5/1966 | Huhn | ............. | 406/42 |
| 3,466,095 A | * | 9/1969 | Weihmuller | ............. | 406/100 |
| 3,724,908 A | * | 4/1973 | Burrough et al. | ............. | 406/71 |
| 4,412,761 A | * | 11/1983 | Sorensen et al. | ............. | 406/98 |
| 4,480,397 A | * | 11/1984 | Vachon | ............. | 37/234 |
| 4,832,538 A | * | 5/1989 | Bullerman et al. | ............. | 406/98 |
| 6,840,854 B2 | * | 1/2005 | Redekop | ............. | 460/112 |
| 7,137,237 B2 | * | 11/2006 | Van Vooren et al. | ............. | 56/12.8 |
| 2005/0245301 A1 | | 11/2005 | Redekop et al. | | |
| 2007/0015556 A1 | * | 1/2007 | Johnson et al. | ............. | 460/111 |

FOREIGN PATENT DOCUMENTS

| | | |
|---|---|---|
| DE | 19908111 C1 | 2/1999 |
| DE | 102006017404 A1 | 10/2007 |
| DE | 102007037485 B3 | 1/2009 |
| WO | 03071857 A1 | 9/2003 |
| WO | 2008156419 A1 | 12/2008 |

OTHER PUBLICATIONS

European Search Report dated Oct. 15, 2010 (5 pages).

* cited by examiner

*Primary Examiner* — Robert Pezzuto
*Assistant Examiner* — Mai Nguyen (57) ABSTRACT

A crop residue chopping and spreading arrangement is described with a straw chopper (60) and an impeller blower (100) arranged downstream of the straw chopper (60). The impeller blower comprises impeller paddles (102) that can be set in rotation about a rotational axis (108) and an end-side cover (128) arranged directly adjacent to the impeller paddles (102). The impeller paddles (102) receive crop residue in a take-up region from the straw chopper (60) and discharge it in a discharge region onto a field. The end-side cover (128) is provided in front of the discharge region, with respect to the direction of rotation of the impeller paddles (102), with an opening (194) through which, during operation, the impeller paddles (102) take in air and discharge it in the discharge region, wherein this arrangement increases the throwing range of the impeller blower (100).

9 Claims, 7 Drawing Sheets

CROP RESIDUE CHOPPING AND SPREADING ARRANGEMENT FOR A COMBINE HARVESTER

FIELD OF THE INVENTION

The invention relates to a crop residue chopping and spreading arrangement for a combine harvester.

BACKGROUND OF THE INVENTION

Agricultural combine harvesters are large machines that harvest, thresh, separate, and clean agriculturally grown crops bearing grain. The resulting clean grain is stored in a grain tank arranged on the combine harvester. The threshed straw is usually either chopped and spread on the field across the width of the cutting tool or led around the straw chopper and laid on the field in a swath in an unchopped form, in order to be able to be taken up later with a baler. The crop residue remaining on the rear outlet of the cleaning device, such as chaff and small straw parts, is spread on the field by a chaff scatterer or led through the straw chopper and spread on the field.

DE 199 08 111 C1 describes a combine harvester with a straw chopper and two impeller blowers arranged laterally one next to the other and following the straw chopper for the widely spread discharge of the straw across the field. The outlet of the straw chopper and the inlet of the impeller blowers that are arranged in a housing and that comprise impeller paddles rotating about an approximately perpendicular axis are arranged in one plane for the purpose of transferring material without changing the direction. Casings that join between the impeller blowers into a front tip facing the straw chopper are mounted around the impeller blowers. In the rear region, the casings are separated, in order to discharge the straw onto the field. Above the impeller blowers there is a cover, while there is no cover on their bottom side.

In US 2007/0015556 A1, a combine harvester with a straw chopper is described in which the outlet of the straw chopper loads the subsequent impeller blowers from below on their periphery at an acute angle. Above the impeller blowers there is a cover, while on their bottom side there is no cover. The top-side cover is provided with a few openings through which the air conveying elements mounted above a rotating disk take in air. On the bottom side of the disk, the impeller paddles of the impeller blowers are mounted. The additional drawn in air should prevent crop residue from collecting between the disk and the upper cover or on the impeller paddles.

DE 10 2007 037 485 B3 shows a combine harvester in which the straw chopper discharges the crop residue in free fall and loads the impeller blowers in the axial direction at an acute angle.

WO 2008/156419 A1 describes a similar arrangement of the straw chopper and impeller blower, but the flow of crops downstream of the straw chopper is deflected by a baffle plate, so that it strikes the impeller blower in the axial direction, but at a relatively acute angle. Here, the middle part of the flow of crop residue is deflected less strongly than the outer part, in order to achieve that the speed of the crop residue already existing after leaving the straw chopper is used to the highest possible degree, in that the impeller blowers rotating inward with their front sides are loaded in front of the rotational axis with the outer part of the flow of crop residue, while the middle part of the flow of crop residue is thrown against the impeller blower in the region at the back of the rotational axis. The impeller blowers are arranged in housings that are open, apart from the deflection plates, on their axial end face on the side of the charge and that are closed on the other end face.

In the prior art, the impeller blowers are consequently covered by a cover on one axial end face at the rear half at which the crop residue is discharged takes place, while the other axial end face is not covered (that is, in the case of US 2007/0015556 A1, DE 10 2007 037 485 B3, and WO 2008/156419 A1 located on the side from which the impeller blowers are loaded by the straw chopper in the axial or radial direction at an angle and, in the case of DE 199 08 111 C1, on the bottom side). To this end, it has proven disadvantageous that the desired throwing range is not sufficient in all cases for covering the widths of modern cutting tools.

SUMMARY THE INVENTION

The problem forming the basis of the invention is to disclose a crop residue chopping and spreading arrangement with a straw chopper and two impeller blowers arranged downstream of the straw chopper for a combine harvester in which the throwing range is increased compared with the prior art.

This problem is solved according to the invention by the teaching of claim 1, wherein in the additional claims, features are listed that refine the solution in advantageous ways.

A crop residue chopping and spreading arrangement for a combine harvester comprises a straw chopper and at least one impeller blower arranged downstream of the straw chopper with respect to the direction of flow of the material. In harvesting operation, the straw chopper chops crop residue fed to it, in particular, straw. It can also convey other crop residue, for example, chaff, with its blades and optional, additional transport paddles, be it together with the straw in the chopping operation or selectively only this other crop residue in a straw-swath-laying operating mode in which the straw is led past the straw chopper. The crop residue conveyed from the straw chopper is taken up during operation by the impeller paddles of the impeller blower, wherein these paddles can be set in rotation about a rotational axis in a take-up region, and can be discharged again in a discharge region and spread across the field. An end-face cover is mounted directly adjacent to an end face of the envelope cylinder of the impeller paddles (i.e., without intermediate elements that would hinder air flow; a certain distance between the cover and the impeller paddles, however, is possible). The end-face cover is provided in front of the discharge region with respect to the direction of rotation of the impeller paddles with an opening through which, during operation, the impeller paddles take in air and discharge it again in the discharge region.

In this way, the throwing range of the impeller blower is improved by the additional air taken in.

Advantageously, two impeller blowers that rotate in opposite directions are arranged laterally one next to the other. The direction of rotation is arbitrary, but it has proven effective when, during operation, the regions of the impeller blowers facing the straw chopper each rotate inward.

It was found that the air is discharged by the impeller paddles approximately a quarter rotation after being taken in through the opening. For impeller blowers rotating outward in their rear regions, it is consequently provided by the cover (with the exception of the opening) to block the rear half of the impeller blowers, in order to place the discharge region in the outer, rear quadrant of the impeller blowers. Then the opening is located in the inner, rear quadrant of the impeller blower. For different rotational directions of the impeller blowers, the opening can be located accordingly in the rear or front, outer quadrants of the impeller blower.

The shape of the opening is arbitrary in the scope of the concept according to the invention, for example, it can be circular, rectangular, or sector-shaped, wherein the tip points, in particular, toward the rotational axis of the impeller blower. In a preferred embodiment, the opening is bounded at the front by an edge extending perpendicular to the forward direction of the combine harvester. Toward the outside it can be bounded by an edge extending backward or at an angle backward and outward.

In order to generate the targeted discharge of the crop residue in the rear, outer quadrant of the impeller blowers, a shield that covers the lateral surface of the impeller blower on the outside and whose position advantageously can be changed can be mounted in the inner, rear quadrant of the impeller blower.

The impeller paddles can be mounted so that they can rotate together with a plate located on the side of the impeller paddles facing away from the shield. An additional cover can be located on the side of the plate facing away from the impeller paddles.

There are different possibilities with respect to the question of the orientation of the rotational axis of the impeller blower and the position of the shield. For example, the straw chopper could load the impeller blower in an exactly radial direction (cf. DE 199 08 111 C1) or the outer edge of the impeller blower in the radial direction at an acute or obtuse angle (see US 2007/0015556 A1) or the crop residue is fed to the impeller blower in the axial direction at an acute or obtuse angle with (see WO 2008/156419 A1) or without (see DE 10 2007 037 485 B3) deflection of the crop residue downstream of the straw chopper by a baffle element. Here, a gap that is open to the surroundings can remain between the straw chopper and the impeller blower or a crop residue guide element is mounted between the outlet of the straw chopper housing equipped with a concave base and the impeller blower that can be constructed as a pure guide element and does not deflect the flow of crop residue, or deflects it in a desired direction, as described, in particular, in WO 2008/156419 A1. The shield can be located on the end face of the impeller blower from which it is loaded in the axial or radial direction with the crop residue or on the other side. Consequently, the shield can be positioned on the top side or bottom side of the impeller blower. Two shields with opening could also be mounted on both end faces of the impeller blower.

BRIEF DESCRIPTION OF THE DRAWINGS

An embodiment of the invention is explained below with reference to the figures.

DETAILED DESCRIPTION OF THE PREFERRED EMBODIMENT

Figure 1:
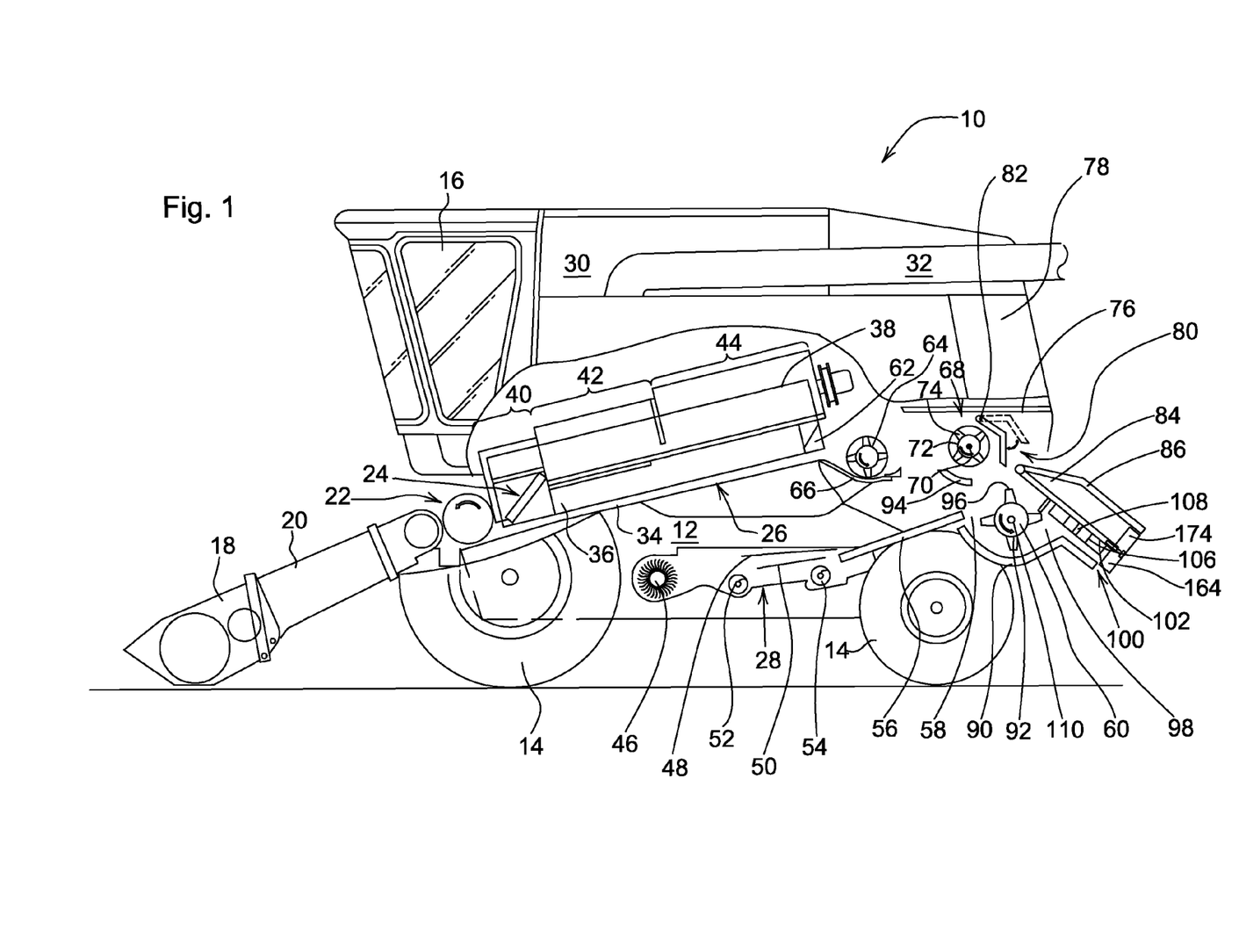
FIG. 1 is a partially sectioned, lateral view of a combine harvester with a straw chopper and impeller blowers.

FIG. 1 shows an agricultural combine harvester 10 with a vehicle chassis 12 with wheels 14 that are located in contact with the ground and that are mounted on the vehicle chassis 12 and are used for propelling the combine harvester 10 in a forward direction that runs to the left in FIG. 1. The operation of the combine harvester 10 is controlled from the control cabin 16. A cutting tool 18 is used to harvest crop plants bearing grain and to feed it to a slope conveyor 20. The harvested material is fed through the slope conveyor 20 of a guide drum 22. The guide drum 22 leads the crop through an inlet transition section 24 to an axial crop processing device 26. Below, directional information, such as front and back, refers to the forward direction of the combine harvester 10 that moves, in FIG. 1, to the left.

The crop processing device 26 comprises a rotor housing 34 and a rotor 36 arranged in this housing. The rotor 36 comprises a hollow drum 38 on which are mounted material processing elements for a loading section 40, a threshing section 42, and a separating section 44. The loading section 40 is arranged on the front side of the axial crop processing device 26. The threshing section 42 and the separating section 44 lie downstream in the longitudinal direction and at the back of the loading section 40. The drum 38 has a frustum-like shape in the loading section 40. The threshing section 42 comprises a frustum-shaped front section and a cylindrical, rear section. At the end of the axial crop processing unit 26 is located the cylindrical separating section 44 of the drum 38. Instead of an axial crop processing unit 26, a tangential threshing drum and an axial separating device following it or a straw shaker following it could also be used.

Grain and husk that fall through a threshing basket allocated to the threshing section 42 and a separating grate allocated to the separating section 44 are fed to a cleaning system 28 with a blower 46 and planar screens 48, 50 that can be put into an oscillating motion. The cleaning system 28 removes the husk and leads the clean grain via a feed auger 52 to an elevator for clean grain (not shown). The elevator for clean grain places the clean grain in a grain tank 30. The clean grain in the grain tank 30 can be unloaded by a discharge auger 32 onto a grain wagon, trailer, or truck. Crop remaining at the rear end of the bottom planar screen 50 is fed back to the crop processing device 26 by means of a feed auger 54 and a return auger (not shown). The crop residue that is discharged at the rear end of the top planar screen 48 and that is composed essentially of chaff (husk) and small straw particles is fed by an oscillating base conveyor 56 backward into an inlet 58 of a straw chopper 60.

Threshed straw leaving the separating section 44 is ejected through an outlet 62 from the crop processing device 26 and fed to an ejection drum 64. The ejection drum 64 interacting with a floor 66 arranged underneath throws the straw backward. An additional conveyor in the form of an overshot drum conveyor 68 is located at the back of the ejection drum 64 and approximately at the vertical height of its rotational axis. The drum conveyor 68 extends horizontally and perpendicular to the forward direction and it can be set in rotation by a suitable drive about its axis 70 on which it is mounted so that it can rotate on the vehicle chassis 12 in a rotational direction in which it works in an overshoot mode and rotates in FIG. 1 in the clockwise direction as indicated by the arrow. For driving the drum conveyor 68, a hydraulic motor is normally used.

The drum conveyor 68 corresponds in its construction to the ejection drum 64 and comprises a rotationally symmetric drum 72 with catches 74 that are distributed around its periphery and that are mounted rigidly on this drum. A trough 94 is arranged underneath the drum conveyor 68.

Above the ejection drum 64 and the drum conveyor 68, a top wall 76 is mounted that extends horizontally and in the forward direction and that ends above engine compartment 78 at the bottom. On the wall 76, a flap 80 is hinged at its front end adjacent to the drum conveyor 68 so that it can pivot about an axis 82 extending horizontally and perpendicular to the forward direction between a swath-laying position and a chopping position. The flap 80 is curved concavely, wherein the radius is adapted to the drum conveyor 68.

Underneath the bottom and rear end of the flap 80 connects a plate 84 that is connected rigidly to the vehicle chassis 12 without a gap (for the flap 80 located in the chopping position), wherein this plate extends at an angle toward the back and bottom and is connected to a chute 86 that connects to this plate and on which the straw can slide downward onto the field ground in the swath laying mode. The straw swath can still be brought into a desired shape by guide skids or guide grates (not shown) attached to the top side of the chute 86.

The flap 80 can pivot about the axis 82 between the chopping position in which it is shown in FIG. 1 with continuous lines and a swath-laying position in which the flap 80 is shown in the figure with dashed lines and it extends backward above the flow of straw.

The straw chopper 60 is located underneath the plate 84 and is composed of a straw chopper housing 90 and a rotor 92 arranged in this housing, wherein this rotor can rotate about a horizontal axis running perpendicular to the forward direction and wherein this rotor has chopping blades 96 that are distributed about the periphery of the rotor 92 and that are suspended so that they can swing. On the rotor 92, additional impeller paddles (not shown) can be mounted, or some or all chopping blades 96 may comprise paddles for feeding air. Downstream of an outlet 98 of the straw chopper 60 there are two impeller blowers 100 that are arranged laterally one next to the other underneath the chute 86 and of which only one can be seen in FIG. 1. The impeller blowers 100 comprise a plurality of impeller paddles 102 each of which can be set into rotation by a hydraulic motor 106 about their corresponding rotational axis 108 (extending, for example, vertically but at a slight angle backward and upward) and which feeds the crop residue to the straw chopper 60 from below in the axial direction at an obtuse angle relative to the rotational axes of the impeller blowers 100.

The rotational axis 110 of the rotor 92 of the straw chopper 60 extends horizontally and perpendicular to the forward direction. The impeller blowers 100 are arranged laterally one next to the other at the back of the straw chopper 60. The impeller blowers 100 are located within the width of the straw chopper 60. The impeller blowers 100 are mounted by holders (not shown) on the frame 12 of the combine harvester 10 and/or on the chute 86. It would also be possible to arrange the straw chopper 60 and the impeller blowers 100 such that the straw chopper 60 charges the impeller blowers 100 from above. In the case of a different embodiment, the rotational axes 108 of the impeller blowers 100 are arranged horizontally or exactly vertically.

In the swath-laying position of the flap 80, the straw chopper 60 feeds only the crop residue from the cleaning system 28 to the impeller blowers 100 that are distributed, for example, across the width of the cutting tool 18 onto the field ground. In the chopping mode, the straw chopper 60 also chops the straw at the outlet 62 of the crop processing device 26 that is thrown by the ejection drum 64 and the drum conveyor 68 against the flap 80 and then falls downward into the inlet 58 of the straw chopper 60.

Figure 2:
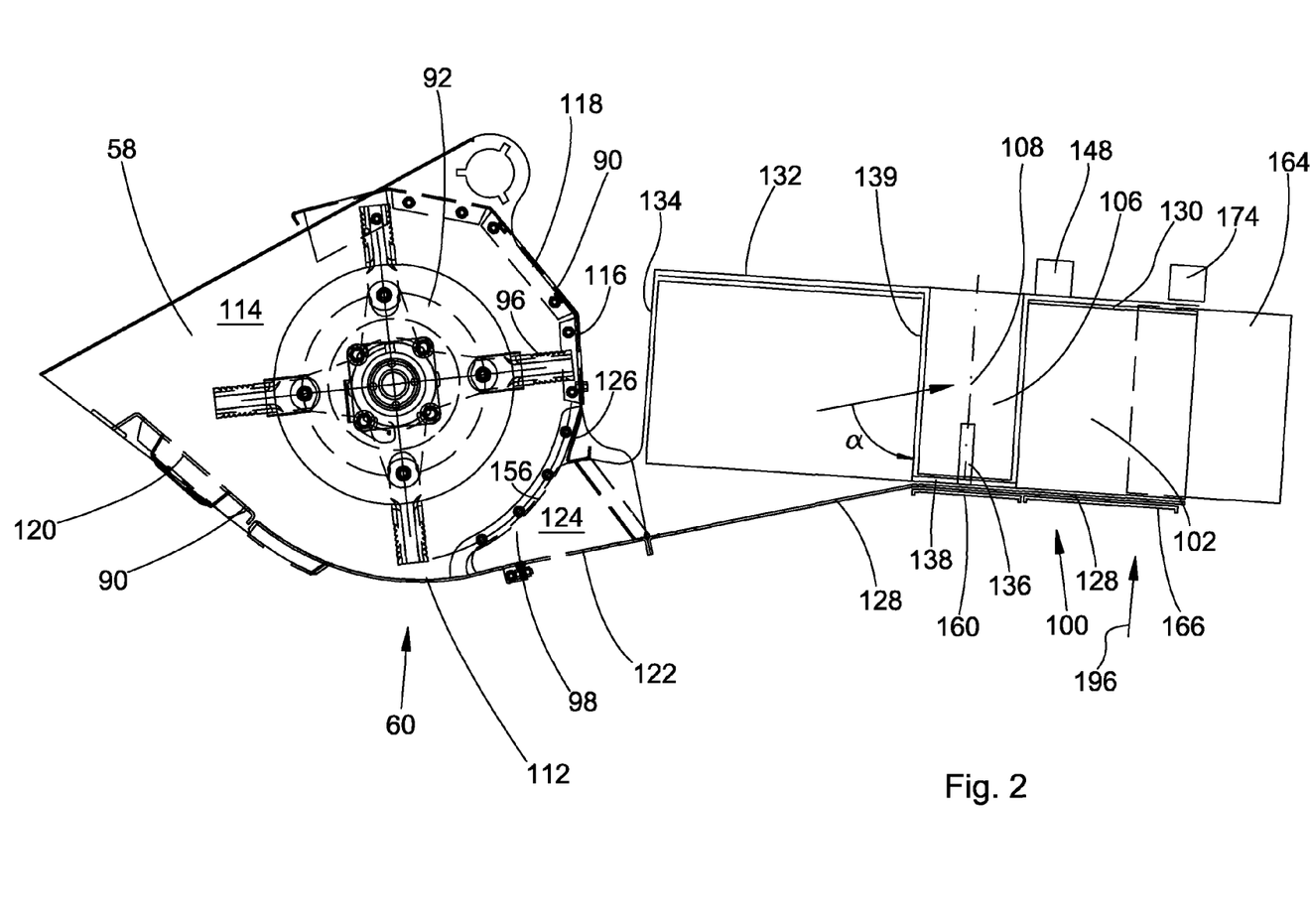
FIG. 2 is an enlarged, lateral view of the straw chopper and an impeller blower.
Figure 3:
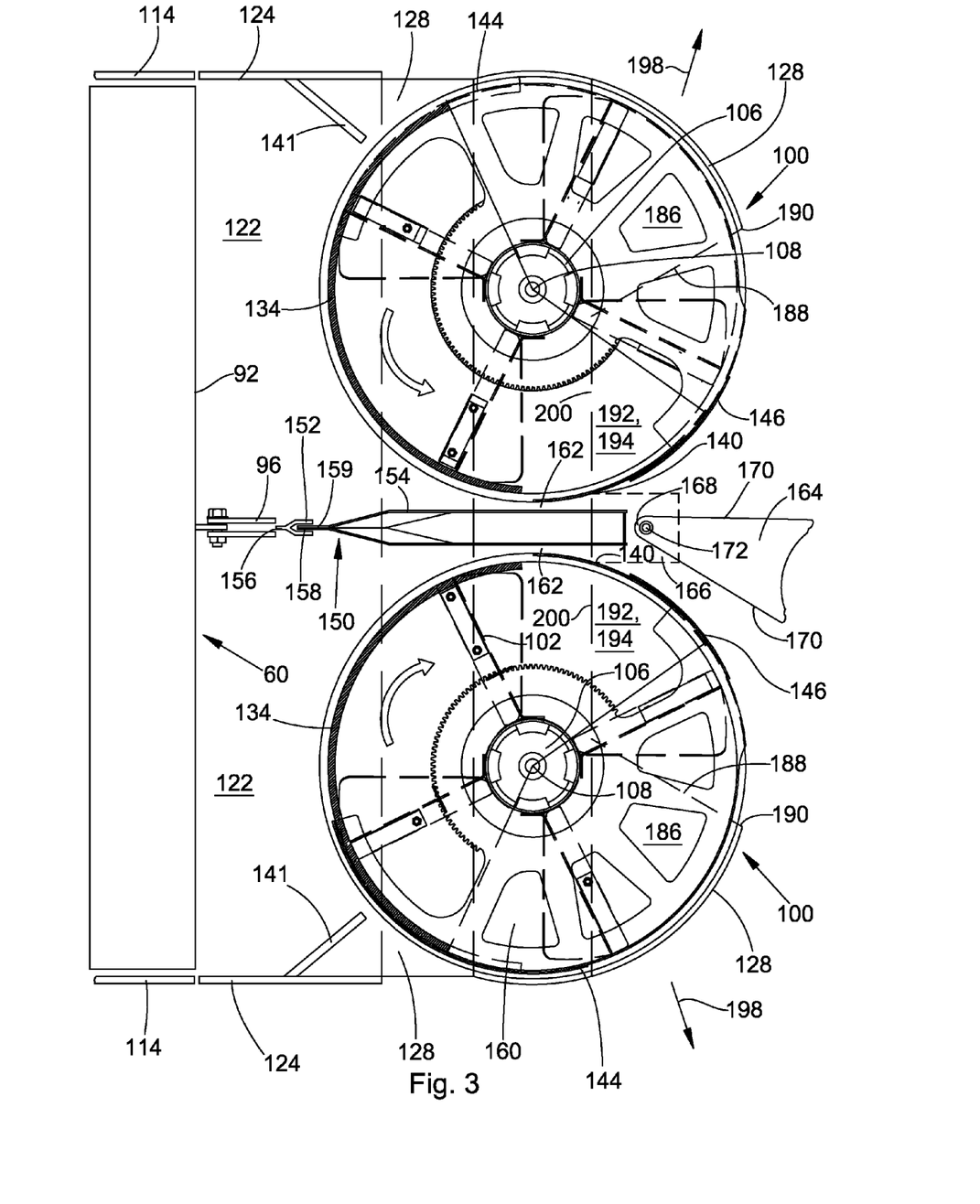
FIG. 3 is a top view onto the straw chopper and the impeller blower.

FIGS. 2 and 3 will now be referenced, in which the crop residue chopping and spreading arrangement of the combine harvester 10 is shown in a side view (FIG. 2) and a top view (FIG. 3). The crop residue chopping and spreading arrangement comprises the straw chopper 60 and the impeller blowers 100. The straw chopper housing 90 comprises a base 112, two side walls 114, and additional cross plates 116, 118, 120 that connect, like the base 112, the side walls 114 to each other and that enclose the rotor 92. The base 112 is arranged on the bottom side of the straw chopper housing 90 and encloses the envelope defined by the chopping blades 96 with a circular-arc shape in a relatively small distance with a radius. Counter blades (not shown) can also be provided that are mounted on the straw chopper housing 90 and that penetrate into the envelope of the chopping blades 96, in order to effectively chop the crop residue.

Figure 4:
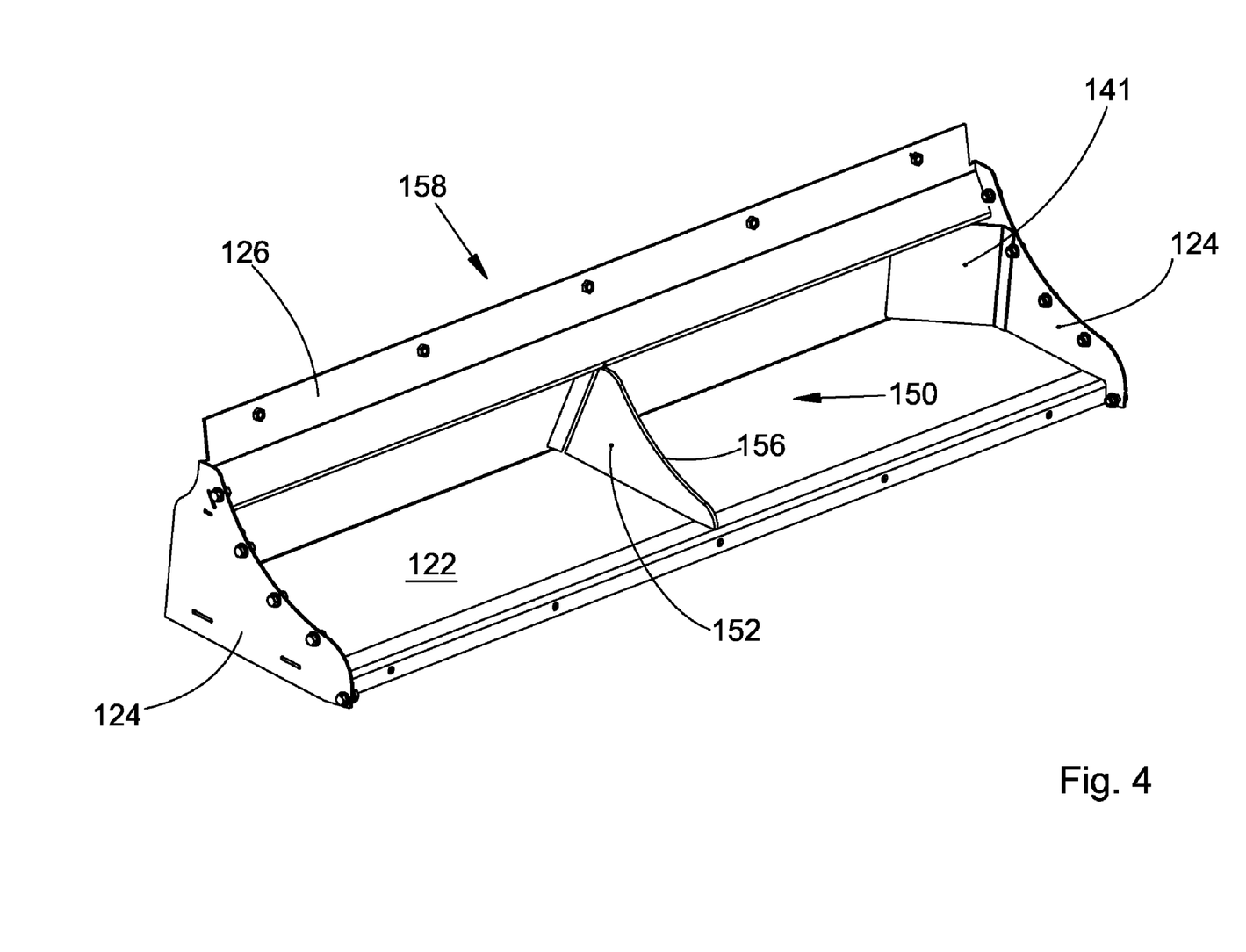
FIG. 4 is a perspective view of a crop residue guidance element.

In the direction of flow of the crop residue, a crop residue guide element 122 connects to the base 112, wherein this guide element is shown in a perspective view in FIG. 4. The crop residue guide element 122 is arranged between the side wall extensions 124 that are each connected to a side wall 114 of the straw chopper housing 90 by screw connections and that extend parallel to the side walls. The crop residue guide element 122 is flat (and consequently has a radius of ∞). The crop residue guide element 122 is angled downward on its front end, in order to form a flange that is screwed with a similarly downward angled flange on the back side of the base 112. Through this connection, projecting edges are avoided at which crop residue could collect. A cross plate 126 is attached to the top side of the side wall projections 124, wherein this cross plate bounds the outlet 98 of the straw chopper 60 at the top. A cross plate 116 of the straw chopper housing 90 attaches to the cross plate 126 at the top. It should be noted that the crop residue guide element 122 could be produced integrally with the base 112, just like the side wall projections 124 could also be produced integrally with the side walls 114. The shown, two-part embodiment could use, however, the straw chopper 60 without the crop residue guide element 122 and side wall projections 124 (or with a different crop residue guide element and other side wall projections, not shown) in combination with a distributor base with adjustable guide plates.

Outer guide elements 141 that extend at an angle of approximately 45° inward and backward are mounted on the side wall extensions 124 (see FIG. 4). They are rectangular in the top view and can be curved across their entire length or only in their front region that connects to a region connected to the side wall projection 124 and extending parallel to it. In the vertical direction, the outer guide elements 141 are flat. It would also be possible to mount the outer guide elements 141 additionally or exclusively on the crop residue guide element 122. They could also be shaped like a type of plowshare or a skid.

On the bottom side of the impeller blowers 100 there is an angled cover 128 that extends from a position shortly before the rotational axes 108 up to the rear end of the impeller blowers 100. The cover 128 has a front section that extends in the plane of the crop residue guide element 122 and contacts, with a downward angled flange, an upward angled flange of the crop residue guide element. These flanges can be screwed to each other or can only contact each other, in order to be able to more easily move the impeller blowers 100 into a transport position separated from the straw chopper 60. Underneath the cover 128 and the hydraulic motors 106 there is a cross carrier 160 that extends perpendicular to the forward direction and on which the shafts 136 of the hydraulic motors 106 are supported by suitable bearings (not shown). In the middle of the cross carrier 160, a carrier 166 is mounted, wherein this carrier extends backward and is used for the lower support of the rotational axis 172 of a guide element 164 that is explained in detail farther below.

The lower output shafts 136 of the hydraulic motors 106 mounted on the cover 132 drive the impeller paddles 102 by means of a cross connection 138 and a cylindrical shaft 139 that is mounted on its top end on a plate 130 with a middle opening. The impeller paddles 102 of the impeller blower 100 extend exactly across the axial dimension of the shaft 139. With their top sides, the impeller paddles 102 contact the plate 130 or are mounted on this plate (e.g., welded). Above the plate 130 there is a cover 132 that covers the impeller blowers 100 at the top and on whose front side there are two semicircular sub-casings 134 surrounding each impeller blower 100 at the front in the radial direction. Additional sub-casings 140 connect to the adjacent insides of the impeller blowers 100, wherein gaps 142 (see FIG. 5) still remain between the sub-casings 134 and the sub-casings 140.

Figure 5:
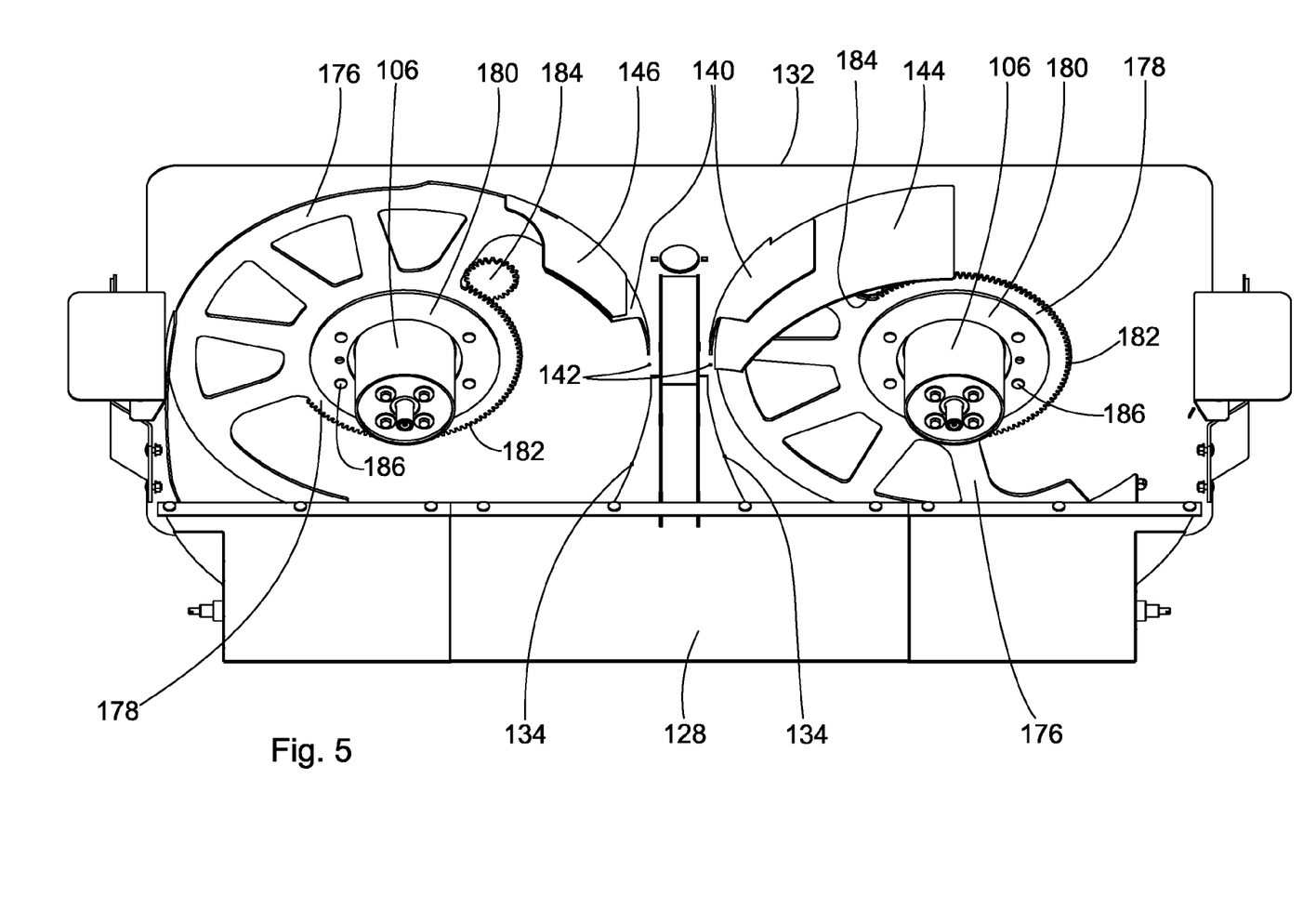
FIG. 5 is a perspective view of the impeller blower from behind and below with removed rotating plates and impeller paddles, wherein, in the case of the right impeller blower, a longer shield is in an active position and, in the case of the left impeller blower, a shorter shield is in the active position.

Between the two impeller blowers 100 there is a two-part guide element 150 that comprises a front part 152 and a rear part 154. The front part 152 is mounted on the crop residue guide element 122 and is adapted with its front tip 156 to the envelope circle of the chopping blades 96, so that it has a circular-arc shape across its tip 156 adjacent to the envelope circle of the chopping blades 96, and this tip is arranged at a relatively small distance from the envelope circle of the chopping blades 96. In this way it is achieved that crop residue collecting there, especially under moist crop conditions, is removed by the chopping blades 96, so that there is no risk of undesired accumulation of crops at the tip 156, which could possibly lead to blockage. On its back side, the front part 152 forms a slot 158, with a flat, front plate 159 of the rear 154 penetrating into this slot. At the back of the front plate 159, the rear part 154 widens and is hollow. The rear part 154 is mounted on the bottom side of the cover 132 and on the top side of the cover 128, which form, with the sub-casings 134, 140 and the shields 144, 146, an impeller blower housing.

With reference to FIG. 3 it can be seen that passages 162 are provided between the guide element 150 and each of the sub-casings 134, 140 of the impeller blower 100 adjacent to the guide element, wherein part of the crop residue flow discharged in the middle region of the straw chopper 60 can flow through these passages from the straw chopper 60 backward onto the field.

At the back of the rear part 154 of the guide element 150 there is a moving guide element 164 with a front tip 168 that is located at the back of the rotational axes 108 of the impeller blowers 100 in the area underneath and outside of the area swept by the blowers and two diverging, lateral, straight walls 170 that are each arranged adjacent to an impeller blower 100. The moving guide element 164 can be set into an oscillating motion about an axis 172 lying at the front and extending parallel to the rotational axis 108 of the impeller blower 100 by a drive 174 mounted above the cover 132 at the back of the hydraulic motors 106. Refer to DE 10 2007 037 485 B3 and DE 10 2008 055 003 A1 whose disclosure is incorporated into the present document through this reference.

FIGS. 2 and 3 will now be referenced again. The front section of the cover 128 extends from the flange angled downward up to shortly in front of the rotational axis 108 of the impeller blower 100 and transitions there into a rear section. The rear section of the cover 128 extends up to below the rear end of the impeller blower 100 and orthogonal to the rotational axis 108. The outer edge of the cover 128 follows the periphery of the impeller blower 100 coming from the flange up to a rear tip 190 in the outer, rear quadrant 186. Here, the rear, outer quadrant 186 of the impeller blower 100 is covered almost completely at the bottom. A rear, inner edge 188 extends from the rear tip 190 of the cover 128 that is located slightly offset to the outside relative to the rotational axis 108 in a straight line at an angle towards the front and inside until it reaches the cross carrier 160 offset to the inside relative to the rotational axis 108. The front boundary of the opening 194 is formed by the rear edge 200 of the cross carrier 160. In the inner, rear quadrant 192, the cover 128 thus forms an approximately sector-shaped opening 194.

Figure 6:
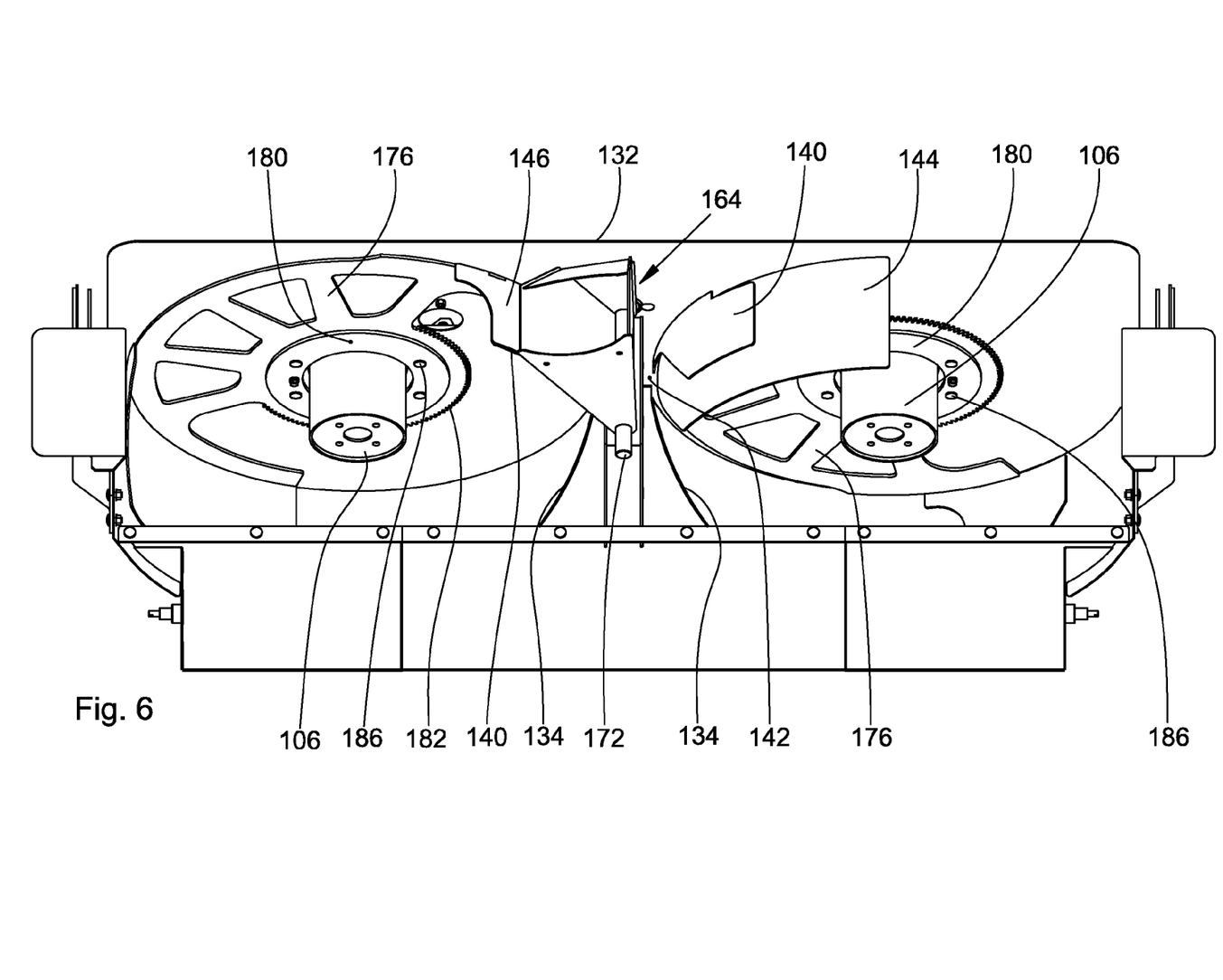
FIG. 6 is the view from FIG. 5, wherein, for the left impeller blower, the shorter shield is moved into a further retracted position.
Figure 7:
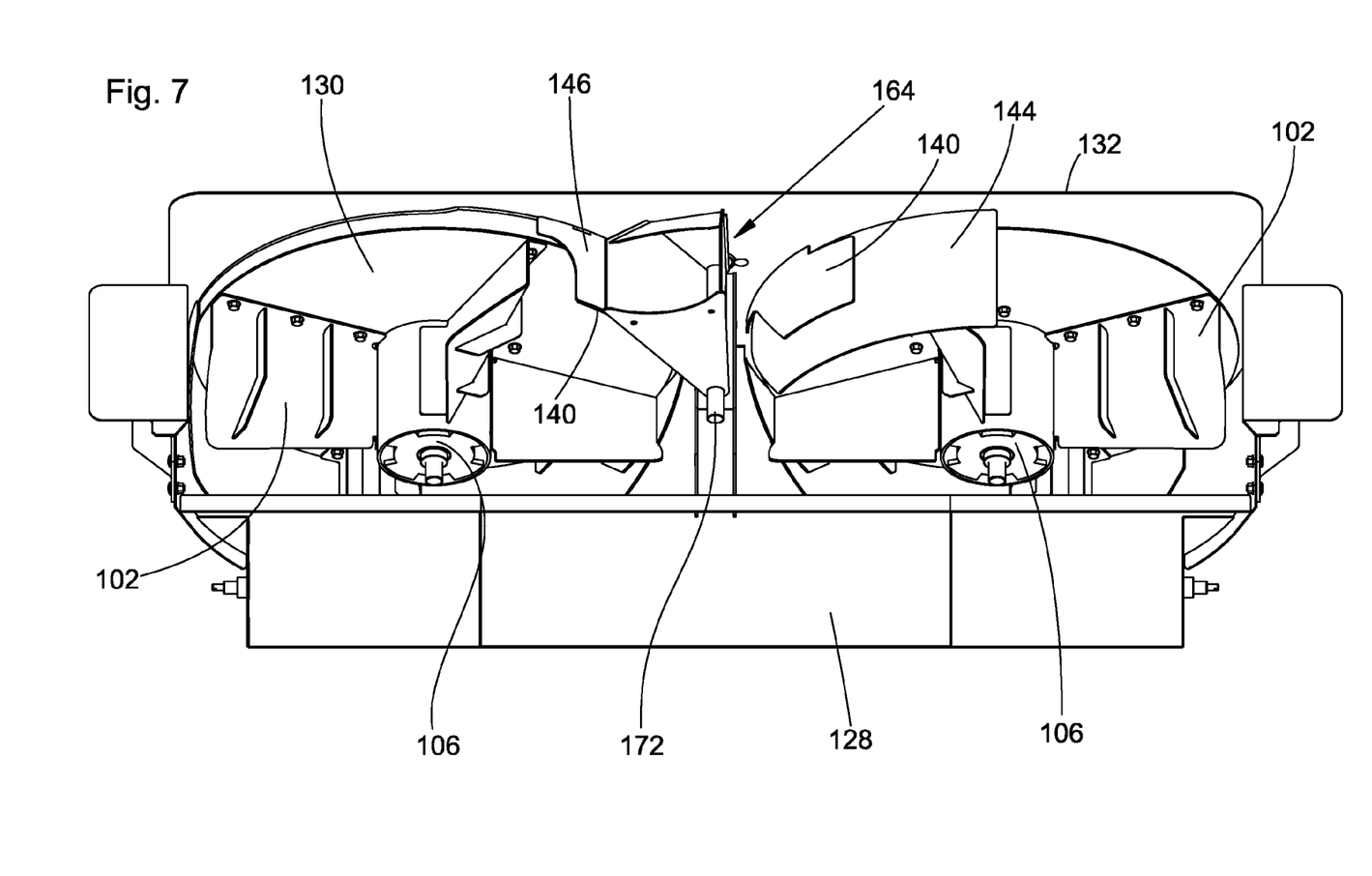
FIG. 7 is the view from FIG. 6 with mounted rotating plates and impeller paddles.

As can be seen in FIGS. 5 to 7, the sub-casings 140 are equipped with a higher, rear section and a lower, front section between which a region rising at an angle is provided. The sub-casings 140 can be lengthened at their rear ends selectively by shorter or longer angular ranges, in that first and second shields 144, 146 with different dimensions in the peripheral direction are positioned by means of an adjustment drive 148 (FIG. 2) controlled manually by the operator from the cabin 16 or automatically as a function of the position of the flap 80 on the rear ends of the sub-casings 140, in order to deflect the crop residue more or less far outward, in that they cover the impeller blowers 100 and prevent the free discharge of the crop residue outward in the radial direction, so that the crop residue can leave the impeller blowers 100 only after it has been led past the shields 144 or 146. Therefore, in the swath-laying mode, by moving the first, longer shield 144 onto the rear, inner end of the sub-casing 140 it can be achieved that the chaff is laid laterally next to the swath or, in the straw-chopping mode, the crop residue is spread uniformly across the field, in that the second, shorter shield 146 is moved onto the rear, inner end of the sub-casing 140. In addition, the shields 144, 146 of both impeller blowers 100 could be moved independently of each other, in order to equalize effects of side winds and/or sloping terrain.

The shields 144, 146 are each mounted in common and in diametrically opposed positions on approximately semicircular rotary holders 176 that are positioned between the cover 132 and the plates 130. The rotary holders 176 comprise a middle region 178 with a central opening through which extends the associated rotational axis 108 of the associated impeller blower 100. The middle region 178 is supported, in particular, supported so that it can slide, in the axial direction between the cover 132 and a mounting disk 180 connected to the cover 132. The central opening of the middle region 178 contacts, in the radial direction, the cover 132 and/or mounting elements 186 that are connected to the mounting disk 180 in the form of screws and is thus fixed in the radial direction. The middle region 178 is provided on the outside with teeth 182 that extend across part of its periphery and that mesh with the toothed gear 184 coupled with the drive 148.

The first, longer shields 144 have an approximately rectangular shape with an angled, front, lower corner. They can be positioned in the radial direction on the inside of the sub-casings 140. In this way, undesired edges are avoided on which the relatively small crop residue can become clogged, when the first shields 144 are located in their active position on the inside of the sub-casings, because in this position the chaff is fed, which is especially critical for this arrangement. The first shields 144 are significantly longer than the sub-casings 140 in the radial direction of the axes 108 of the impeller blowers 100.

The second, shorter shields 146 likewise have approximately rectangular shapes with an opened, back, lower corner. They can be positioned on the outside of the sub-casings 140 in the radial direction. The dimensions of the second shields 146 in the radial direction of the axes 108 of the impeller blower 100 correspond approximately to the dimensions of the sub-casings 140 in the radial direction of the axes 108 of the impeller blower 100.

In FIG. 5, in the case of the impeller blower 100 drawn on the left, the second shield 146 is in the active position in which it connects to the sub-casing 140 toward the back. In the case of the impeller blower 100 drawn on the right, the first shield 144 is in the active position in which it connects to the sub-casing 140 toward the back. In FIG. 6 in which the guide element 164 was also drawn, the position of the shield 144 of the right impeller blower 100 is not changed relative to FIG. 5, while the position of the shield 146 of the left impeller blower 100 was moved in the clockwise direction relative to FIG. 5, which has the result that the crop residue is discharged onto the field increasingly in the vicinity of the longitudinal middle plane of the combine harvester 10. In this way, effects due to side winds and sloping terrain can be equalized by the operator or automatically, in order to spread the crop residue uniformly on the field. In FIG. 7, the position of the shields 144, 146 was not changed relative to FIG. 6, but the plates 130 and the impeller paddles 102 are also drawn. Differently than in FIGS. 5 to 7, the first shields 144 could also be moved into a position in which they connect directly to the sub-casings 134, in order to close the gaps 142 and in order to realize that crop residue is discharged only to the outside.

According to all these conditions, the following function is produced for the crop residue chopping and spreading arrangement in the harvesting mode. The crop residue made from chaff and, in the case of the position shown in FIG. 1, from straw is led through the inlet 58 into the straw chopper 60 and is chopped there, optionally in interaction with (not shown) counter blades, by the chopping blades 96 and ejected through the outlet 98. The crop residue flows above the crop residue guide element 122 and is incident on the impeller paddles 102 of the impeller blower in a take-in region that is formed above the front section of the cover 128 at an angle α of approximately 55 degrees relative to the rotational axis 108 of the impeller blower 100. The impeller paddles 102 then discharge the crop residue in a discharge region that is not covered by the shields 144 or 146 and is located mainly in the rear, outer quadrant 186 of the impeller blower 100. The impeller paddles 102 rotating directly above the cover 128 can draw air through the openings 190 from below (cf. the arrow 196 in FIG. 2) and can be discharged again in the rear, outer quadrant 186 that is not covered by shields 144, 146 in normal operation onto the lateral surface of the impeller blower 100 (cf. the arrows 198 in FIG. 3), which increases the throwing range.

The invention claimed is:

1. A crop residue chopping and spreading arrangement with a straw chopper (60) and at least one impeller blower (100) that is arranged downstream of the straw chopper (60), the impeller blower (100) comprising impeller paddles (102) that can be set in rotation about a rotational axis (108) and a cover (128) arranged directly adjacent to an end face of the envelope cylinder of the impeller paddles (102), wherein the impeller paddles (102) receive, during operation, crop residue from the straw chopper (60) and discharge it in a discharge region onto a field and the cover (128) is provided upstream of the discharge region, with respect to the rotational direction of the impeller paddles (102), with an opening (194) through which, during operation, the impeller paddles (102) take in air and discharge it again in the discharge region, wherein apart from the opening (194), the cover (128) covers a rear half of the impeller blower (100), the discharge region lies in an outer, rear quadrant (186) of the impeller blower (100), and the opening (194) is located in an inner, rear quadrant (192) of the impeller blower (100) and further wherein the inner, rear quadrant (192) is immediately upstream of and adjacent to the outer, rear quadrant (186).

2. The crop residue chopping and spreading arrangement according to claim 1, wherein two impeller blowers (100) are provided that are arranged laterally one next to the other and that rotate opposite to each other.

3. The crop residue chopping and spreading arrangement according to claim 2, wherein during operation, the impeller blowers (100) rotate inward on a side of the blowers facing the straw chopper (60).

4. The crop residue chopping and spreading arrangement according to claim 1, wherein the opening (194) is bounded at the front by an edge (200) extending perpendicular to the forward direction.

5. The crop residue chopping and spreading arrangement according to claim 1, wherein the opening (194) is bounded on the outside by an edge (188) extending one of backward and diagonally backward and outward (188).

6. The crop residue chopping and spreading arrangement according to claim 1, wherein in the inner, rear quadrant (192) of the impeller blower (100), a shield (144, 146) is mounted covering the side surface of the impeller blower (100) outward.

7. The crop residue chopping and spreading arrangement according to claim 6, wherein the position of the shield (144, 146) can be changed.

8. The crop residue chopping and spreading arrangement according to claim 1, wherein the impeller paddles (102) are mounted so that they can rotate together with a plate (130) that is located on the side of the impeller paddles (102) facing away from the shield (128).

9. A combine harvester (10) comprising a crop processing device (26) and a crop residue chopping and spreading arrangement with a straw chopper (60) and at least one impeller blower (100) that is arranged downstream of the straw chopper (60), the impeller blower (100) comprising impeller paddles (102) that can be set in rotation about a rotational axis (108) and a cover (128) arranged directly adjacent to an end face of the envelope cylinder of the impeller paddles (102), wherein the impeller paddles (102) receive, during operation, crop residue from the straw chopper (60) and discharge it in a discharge region onto a field and the cover (128) is provided upstream the discharge region, with respect to the rotational direction of the impeller paddles (102), with an opening (194) through which, during operation, the impeller paddles (102) take in air and discharge it again in the discharge region, wherein apart from the opening (194), the cover (128) covers a rear half of the impeller blower (100), the discharge region lies in an outer, rear quadrant (186) of the impeller blower (100), and the opening (194) is located in an inner, rear quadrant (192) of the impeller blower (100) and further wherein the inner, rear quadrant (192) is immediately upstream of and adjacent to the outer, rear quadrant (186).

* * * * *